United States Patent
Matsuura et al.

(10) Patent No.: US 8,295,559 B2
(45) Date of Patent: Oct. 23, 2012

(54) FACE IMAGE PICKUP DEVICE AND METHOD

(75) Inventors: Yukihiro Matsuura, Nagoya (JP); Akira Fujimoto, Komaki (JP); Tadashi Asano, Gifu (JP); Yukihiko Yoshinaga, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 321 days.

(21) Appl. No.: 12/679,284

(22) PCT Filed: Nov. 7, 2008

(86) PCT No.: PCT/JP2008/070337
§ 371 (c)(1),
(2), (4) Date: Mar. 19, 2010

(87) PCT Pub. No.: WO2009/060951
PCT Pub. Date: May 14, 2009

(65) Prior Publication Data
US 2010/0254571 A1   Oct. 7, 2010

(30) Foreign Application Priority Data
Nov. 9, 2007 (JP) .................................. 2007-291965

(51) Int. Cl.
*G06K 9/00* (2006.01)
*G06K 9/66* (2006.01)
*H04N 5/33* (2006.01)

(52) U.S. Cl. ......... 382/118; 382/103; 382/190; 348/164

(58) Field of Classification Search .................. 382/104, 382/115, 118, 162–172, 173, 264, 274, 276, 382/174, 257; 348/77, 78, 113, 118, 169, 348/172; 356/375, 385; 395/905; 340/937
See application file for complete search history.

(56) References Cited

U.S. PATENT DOCUMENTS

| | | | |
|---|---|---|---|
| 6,772,057 B2* | 8/2004 | Breed et al. | 701/45 |
| 7,406,184 B2* | 7/2008 | Wolff et al. | 382/118 |

(Continued)

FOREIGN PATENT DOCUMENTS

JP   2004-030246 A   1/2004

(Continued)

OTHER PUBLICATIONS

International Search Report for PCT/JP2008/070337 dated Dec. 22, 2008, 2 pages total.

*Primary Examiner* — Vu Le
*Assistant Examiner* — Andrae S Allison
(74) *Attorney, Agent, or Firm* — Sughrue Mion, PLLC

(57) ABSTRACT

There are provided a face image pickup device and a face image pickup method which can stably acquire a face image by appropriate illumination, and a program thereof. The face image pickup device comprises a camera which picks up an image of a face of a target person, an illumination light source which illuminates the face of the target person with near-infrared light having an arbitrary light amount, and a computer. The computer detects an area including an eye from the face image of the target person picked up by the camera. The computer measures a brightness distribution in the detected area. Thereafter, the computer controls the illumination light source so as to change the amount of near-infrared light based on the measured brightness distribution.

10 Claims, 16 Drawing Sheets

U.S. PATENT DOCUMENTS

| | | | |
|---|---|---|---|
| 7,410,685 B2 * | 8/2008 | Rosenberger et al. | 428/206 |
| 7,466,847 B2 * | 12/2008 | Komura | 382/118 |
| 7,689,008 B2 * | 3/2010 | Hammoud et al. | 382/117 |
| 7,936,926 B2 * | 5/2011 | Suzuki et al. | 382/190 |
| 2004/0005086 A1 * | 1/2004 | Wolff et al. | 382/118 |
| 2005/0226472 A1 * | 10/2005 | Komura | 382/118 |
| 2007/0014431 A1 * | 1/2007 | Hammoud et al. | 382/103 |
| 2008/0089559 A1 * | 4/2008 | Koumura | 382/117 |
| 2009/0251534 A1 * | 10/2009 | Fujimoto et al. | 348/78 |

FOREIGN PATENT DOCUMENTS

| | | |
|---|---|---|
| JP | 2005-242428 A | 9/2005 |
| JP | 2006-275988 A | 12/2006 |

* cited by examiner

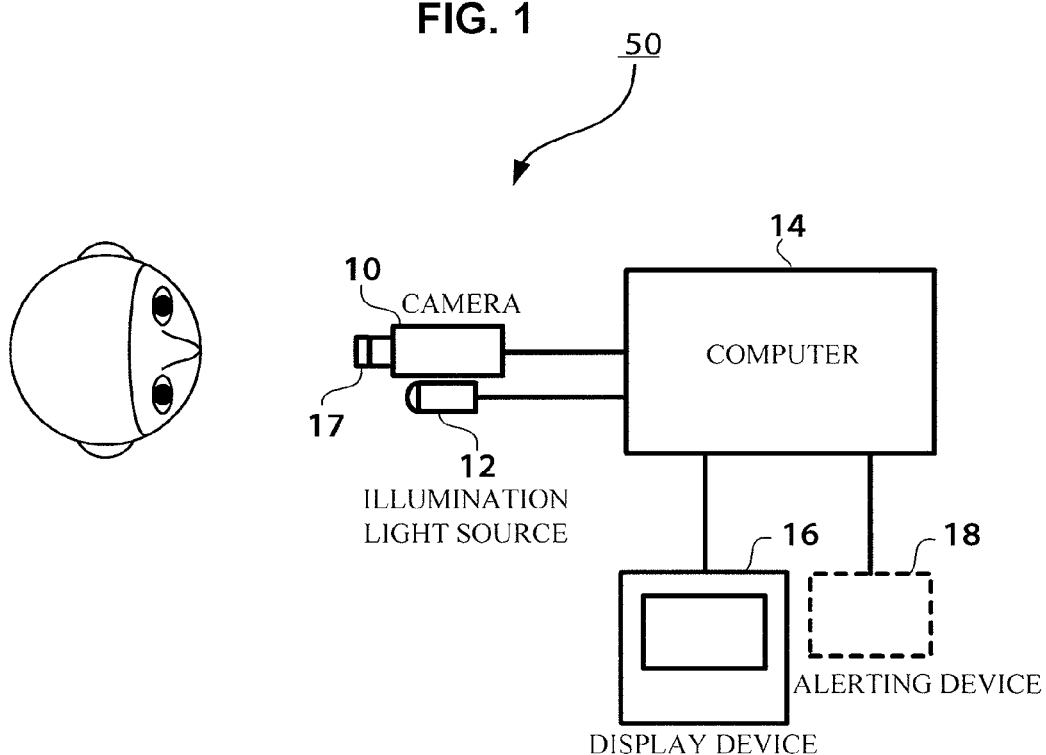
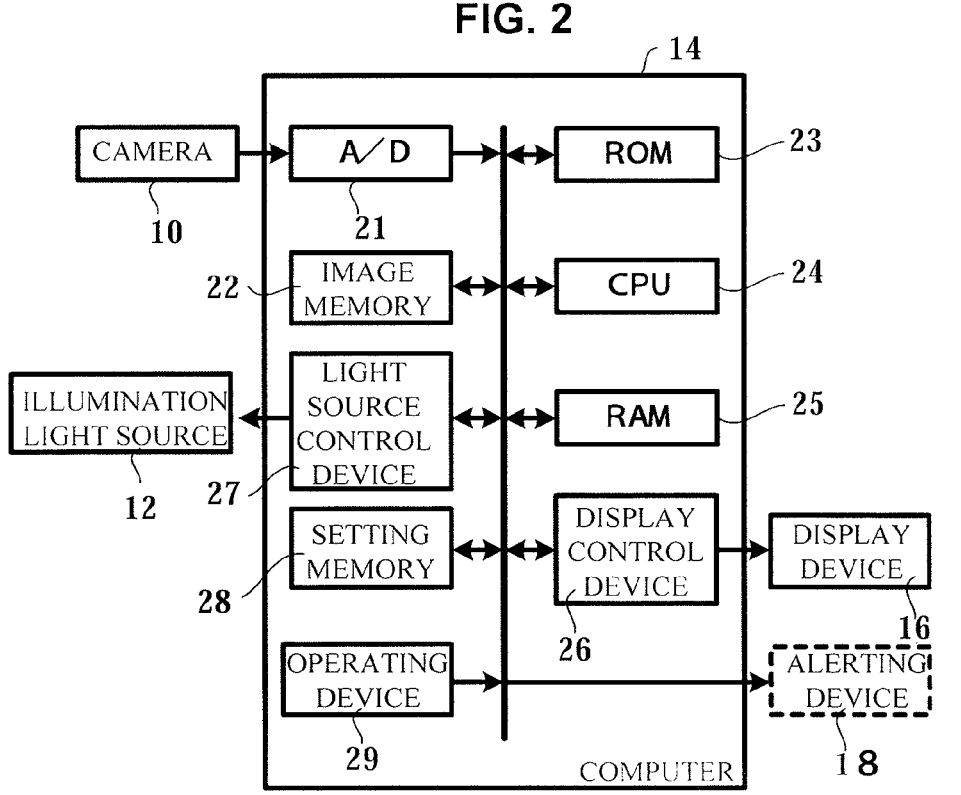

FIG. 3A

OPERATOR OF SOBEL FILTER FOR VERTICAL EDGE DETECTION

| -1 | 0 | 1 |
|----|---|---|
| -2 | 0 | 2 |
| -1 | 0 | 1 |

FIG. 3B

OPERATOR OF SOBEL FILTER FOR HORIZONTAL EDGE DETECTION

| -1 | -2 | -1 |
|----|----|----|
| 0  | 0  | 0  |
| 1  | 2  | 1  |

PARAMETERS USED FOR FACE IMAGE PICKUP PROCESS

| PARAMETER NAME | VALUE |
|---|---|
| EYE AREA SETTING PARAMETER a (=u−w) | 3 |
| EYE AREA SETTING PARAMETER b (=v−m) | 6 |
| UPPERMOST THRESHOLD | 190 |
| LOWERMOST THRESHOLD | 100 |
| ILLUMINATION LIGHT AMOUNT INITIAL VALUE | 50 |
| ILLUMINATION LIGHT AMOUNT SET VALUE | 100 |

FACE IMAGE PICKUP DEVICE AND METHOD

TECHNICAL FIELD

The present invention relates to a face image pickup device and a face image pickup method which pick up an image of the face of a driver on a vehicle or the like.

BACKGROUND ART

There are known face image pickup devices which are installed in a vehicle or the like, pick up an image of the face of a driver to detect a driving status thereof, such as an inattentive driving or a drowsy driving, and to check where the driver is fixing his/her own eyes. Some of such face image pickup devices illuminate the face of a driver by means of a near-infrared LED (Light Emitting Diode) in order to enable acquisition of a face image of the driver without changing the camera mode in daylight and in the nighttime, and pick up a face image of the driver by a camera having a sensitivity in a near-infrared band.

However, when the drive wears an eyeglass, if an image of the face of the driver is picked up by the face image pickup device using near-infrared light, a scenery around the drive may be projected in the eyeglass or illumination light may reflect the front face of the eyeglass and the rear face thereof, so that the image may have a whitened part.

To overcome such a problem, patent literature 1 discloses a technique of causing illumination light to reflect a reflective plate to indirectly irradiate the face of the drive with light. According to such a technique, projection of a scenery and whitened part can be suppressed, thereby acquiring an image with a good quality.

Patent Literature 1: Unexamined Japanese Patent Application KOKAI Publication No. 2005-242428

DISCLOSURE OF INVENTION

Problem to be Solved by the Invention

However, when it is attempted to apply the technique disclosed in patent literature 1 to an actual vehicle, it is difficult to secure a space for mounting the reflective plate. Moreover, it requires a large-output light source in order to compensate the attenuation of illumination light due to the reflective plate. Hence, the foregoing technique is distant.

The present invention has been made in view of the foregoing circumstance, and it is an object of the present invention to provide a face image pickup device and a face image pickup method which optimize the amount of illumination light to stably acquire a face image with a good quality, and a program thereof.

Means for Solving the Problem

To achieve the object, a face image pickup device according to a first aspect of the present invention comprises:

face image pickup unit which picks up an image of a face of a target person;

illumination unit which illuminates the face of the target person with near-infrared light having an arbitrary light amount;

eye area detecting unit which detects an area including an eye from the face image of the target person picked up by the face image pickup unit;

brightness-distribution measuring unit which measures a brightness distribution in the area detected by the eye area detecting unit in the face image of the target person picked up by the face image pickup unit; and control unit which controls the illumination unit so as to change an amount of the near-infrared light based on the brightness distribution measured by the brightness-distribution measuring unit.

For example, the control unit may calculate an average brightness in the area based on the brightness distribution, and may control the illumination unit so as to change an amount of the near-infrared light based on the calculated average brightness.

For example, the control unit may determine whether or not the average brightness is out of a predetermined range, and may control the illumination unit so as to change an amount of near-infrared light upon determination that the average brightness is out of the predetermined range.

For example, the control unit may control the illumination unit so as to increase an amount of the near-infrared light upon determination that the average brightness is out of the predetermined range.

For example, the face image pickup unit may include an optical filter which is arranged on an optical axis for picking up an image of the face of the target person and which allows arbitrary long wavelength including near-infrared light to transmit.

For example, the illumination unit may include an LED (Light Emitting Diode) emitting near-infrared light transmissive through the optical filter, and the LED may illuminate the face of the target person with near-infrared light.

For example, an amount of the near-infrared light emitted by the illumination unit may be adjusted by a current value input into the LED or a duty ratio by pulse light emitting.

For example, the face image pickup unit may be arranged on a top face of a steering column of a vehicle.

For example, the face image pickup unit may be arranged on a top face of an instrumental panel of a vehicle.

For example, the face image pickup unit may be arranged on a top face of a center console of a vehicle.

For example, the face image pickup unit may be arranged in a room mirror of a vehicle.

A face image pickup method according to a second aspect of the present invention is executed by a device comprising face image pickup unit which picks up an image of a face of a target person and illumination unit which illuminates the face of the target person with near-infrared light having an arbitrary light amount, the method comprising:

an eye area detecting step of detecting an area including an eye from the face image of the target person picked up by the face image pickup unit;

a brightness-distribution measuring step of measuring a brightness distribution in the area detected in the eye area detecting step in the face image of the target person picked up by the face image pickup unit; and a control step of controlling the illumination unit so as to change an amount of the near-infrared light based on the brightness distribution measured in the brightness-distribution measuring step.

For example, in the control step, an average brightness in the area may be calculated based on the brightness distribution, and the illumination unit may be controlled so as to change an amount of the near-infrared light based on the calculated average brightness.

A program according to a third aspect of the present invention allows a computer which includes face image pickup unit that picks up an image of a face of a target person and illumination unit that illuminates the face of the target person with near-infrared light having an arbitrary light amount to function as:

eye area detecting unit which detects an area including an eye from the face image of the target person picked up by the face image pickup unit;

brightness-distribution measuring unit which measures a brightness distribution in the area detected by the eye area detecting unit in the face image of the target person picked up by the face image pickup unit; and control unit which controls the illumination unit so as to change an amount of the near-infrared light based on the brightness distribution measured by the brightness-distribution measuring unit.

For example, the control unit may calculate an average brightness of area based on the brightness distribution, and may control the illumination unit so as to change an amount of the near-infrared light based on the calculated average brightness.

Effect of the Invention

According to the present invention, it becomes possible to optimize the amount of illumination light to stably acquire a face image with a good quality.

BRIEF DESCRIPTION OF DRAWINGS

FIG. 1 is a block diagram showing a configuration of a face image pickup device according to an embodiment of the present invention;

FIG. 2 is a block diagram showing a configuration of a computer shown in FIG. 1;

FIG. 3A is a diagram for explaining various data stored in a ROM;

FIG. 3B is a diagram for explaining various data stored in the ROM;

DESCRIPTION OF REFERENCE NUMERALS

Figure 3C:
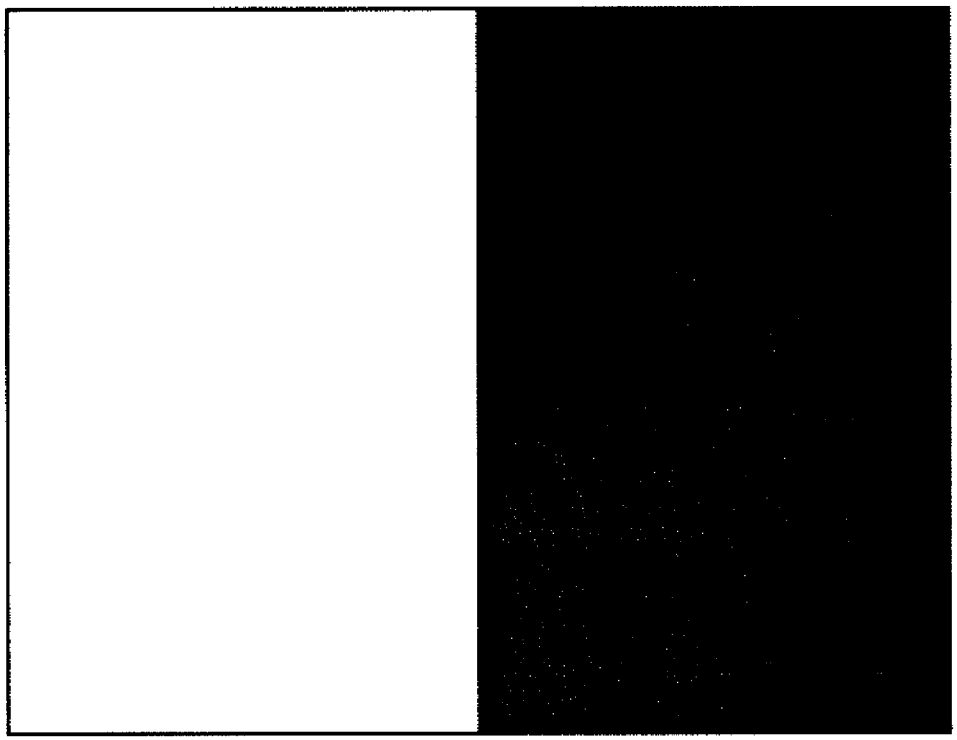
FIG. 3C is a diagram for explaining various data stored in the ROM.

10 Camera
12 Illumination light source
14 Computer
16 Display device
17 Bandpass filter
21 A/D converter
22 Image memory (face image storing unit)
23 ROM
24 CPU (eye detecting unit, eye opening/closing determining unit)
25 RAM
26 Display control device
28 Setting memory
29 Operating device
50 Face image pickup device

BEST MODE FOR CARRYING OUT THE INVENTION

An explanation will be given of a face image pickup device 50 according to an embodiment of the present invention.

As shown in FIG. 1, the face image pickup device 50 includes a camera 10, an illumination light source 12, a computer 14, a display device 16, and a bandpass filter 17.

The camera 10 is a device which shoots the face of a driver and generates a face image. The illumination light source 12 is a device which illuminates the face of the driver. The computer 14 is a device which detects an area including the eyes of the driver. The computer 14 is also a device which controls the illumination light source 12 based on a brightness distribution of a detected area. The display device 16 is connected to the computer 14.

Individual units of the face image pickup device 50 will be explained in more detail.

The camera 10 comprises, for example, a CCD camera. The camera 10 acquires a continuous-tone image of the face of the driver at a constant period (e.g., 1/30 second), and outputs the acquired image. Face images successively output by the camera 10 contain not only (an image of) the face of the driver but also (an image of) a background thereof.

The display device 16 comprises an LCD (Liquid Crystal Display), a CRT (Cathode Ray Tube) or the like. The display device 16 displays a face image, etc., output by the camera 10.

The bandpass filter 17 is arranged on the optical axis of the camera 10. The bandpass filter 17 filtrates light from the exterior, and causes the camera 10 to receive light in a near-infrared range.

The computer 14 is a device which processes a face image picked up by the camera 10 and controls the illumination light source 12.

As shown in FIG. 2, the computer 14 comprises an A/D converter 21, an image memory 22, a ROM (Read Only Memory) 23, a CPU (Central Processing Unit) 24, a RAM (Random Access Memory) 25, a display control device 26, a light-source control device 27, a setting memory 28, and an operating device 29.

The A/D (analog/digital) converter 21 converts an analog image signal picked up by the camera 10 into a digital signal.

The image memory 22 stores image data generated by the camera 10 and digitalized by the A/D converter 21.

The ROM 23 stores a program for controlling the operation of the CPU. The ROM 23 also stores various fix data for executing an image process to be discussed later.

The CPU 24 controls the whole computer 14. The CPU 24 runs the program stored in the ROM 23. Accordingly, the CPU 24 processes successive face images acquired by the camera 10 to detect an eye area. The CPU 24 controls the illumination light source 12 based on a brightness distribution of the eye area.

The RAM 25 functions as a work area for the CPU 24.

The display control device 26 converts video data or the like into a data format that the display device 16 can output under the control of the CPU 24. The display control device 26 outputs it to the display device 16.

The light-source control device 27 controls light-up, light-off, and a light amount of the illumination light source 12. The light-source control device 27 controls the light amount by changing a current value or a duty ratio by pulse light emitting.

Figures 3D, 4:
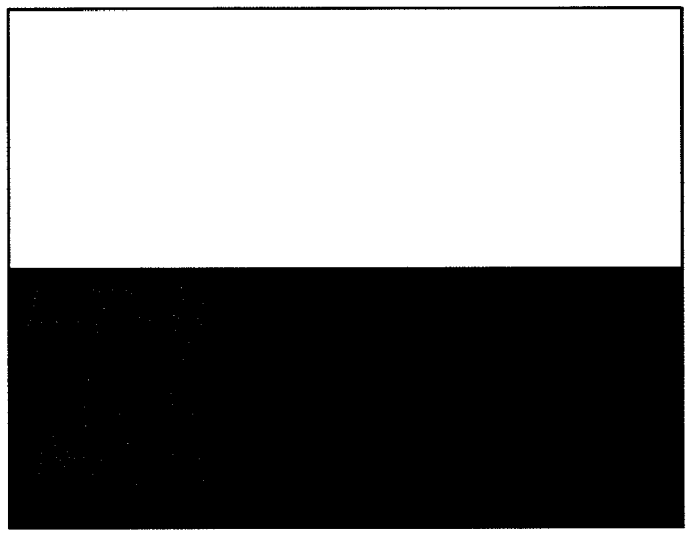
FIG. 3D is a diagram for explaining various data stored in the ROM.
FIG. 4 is a diagram for explaining various data stored in a setting memory.

The setting memory 28 stores various parameters as shown in FIG. 4 beforehand. Various parameters are used when the CPU 24 detects an eye from a face image stored in the RAM 25. This operation will be explained in detail later.

The operating device 29 receives operational information from a user. The operating device 29 outputs an operational signal in accordance with an operation to the CPU 24.

Next, examples of fixed data stored in the ROM 23 will be explained with reference to FIGS. 3A to 3D. First, the ROM 23 stores an operator of a Sobel filter for vertical edge detection as shown in FIG. 3A. The Sobel filter for vertical edge detection is an operator for emphasizing a contrasting density difference in a vertical direction as shown in FIG. 3C. Moreover, the ROM 23 stores an operator of a Sobel filter for horizontal edge detection. The Sobel filter for horizontal edge detection is an operator for emphasizing a contrasting density difference in a horizontal direction as shown in FIG. 3D.

It is assumed that each pixel configuring a face image is set in such a way that each of R, G, and B colors has an 8-bit gradation. Moreover, each color of R, G, and B has any gradation within 256 gradations from 0th gradation to 255th gradation. The 0th gradation is black, and the 255th gradation is white.

Examples of various parameters stored in the setting memory 28 will be explained with reference to FIG. 4.

Eye area setting parameters a, b are parameters for calculating an eye area estimated that an eye is present based on detected face position and nasal aperture position.

An uppermost threshold and a lowermost threshold are thresholds for determining whether or not an average brightness at the eye area is appropriate.

An illumination light amount initial value is a parameter for setting a light amount when the face image pickup device 50 starts up lighting by the illumination light source 12, and is calculated from the minimum light amount that an eye can be stably detected in a nighttime at a standard driving position.

An illumination light amount set value is a parameter for setting a light amount of the illumination light source 12. The face image pickup device 50 controls the light-source control device 27 based on the illumination light amount set value to cause the illumination light source 12 to illuminate.

Note that various parameters stored in the setting memory 28 are changeable by the user.

Next, an explanation will be given of an operation of the face image pickup device 50 having the foregoing configuration according to a first embodiment.

First, with reference to FIGS. 3 to 7, a brief overview of an operation of the face image pickup device 50 of controlling the illumination light source 12 will be explained.

First, the face image pickup device 50 is powered on. This causes the CPU 24 to read out the illumination light amount initial value from the setting memory 28. The CPU 24 sets the illumination light amount initial value as the illumination light amount set value. Next, the CPU 24 causes the illumination light source 12 to light up at the light amount of the illumination light set value.

Figure 5A:
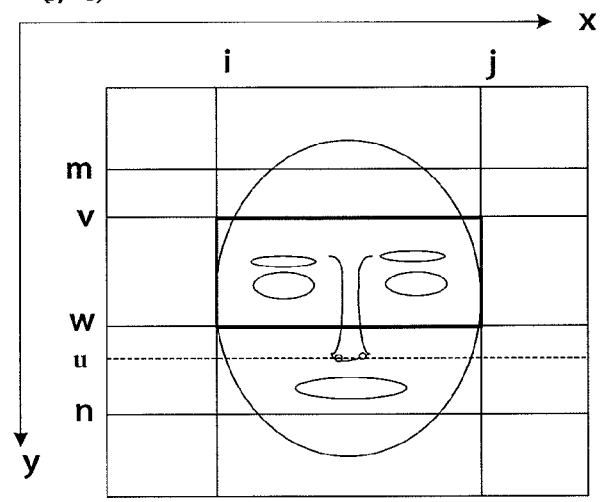
FIG. 5A is a diagram for explaining a general concept of a process of detecting an eye area according to the embodiment of the present invention.

The camera 10 picks up face images of a target person shown in FIG. 5A at a predetermined period (e.g., 1/30 second), and outputs face images. The output face images are successively stored in the image memory 22.

Next, the CPU 24 successively reads out face images stored in the image memory 22. The CPU 24 executes a following process.

First, using the vertical edge detecting Sobel filter (see FIG. 3A), the CPU 24 processes a read-out face image. Next, the CPU 24 detects right and left ends of a face based on brightness at each pixel in the face image. Moreover, using the horizontal edge detecting Sobel filter (see FIG. 3B), the CPU 24 processes the read-out face image. Next, the CPU 24 detects upper and bottom ends of the face based on brightness at each pixel in the face image.

For example, in the case of a face image shown in FIG. 5A, right and left ends of the face are x=i, j, and upper and bottom ends thereof are y=m, n. A position of the face can be detected based on the right and left ends of the face and the upper and bottom ends thereof. It is assumed that the upper end of the face is located between eyebrows and the top of the head. Moreover, it is also assumed that the bottom end of the face is located between the mouth and the jaw.

The CPU 24 detects the position of a nasal aperture from a range where $i \leq x \leq j$, and $(m+n)/2 \leq y \leq n$. More specifically, the CPU 24 detects, as a nasal aperture, a part having brightness smaller than or equal to a predetermined brightness and successive by what corresponds to three to five pixels in the foregoing range of the face image.

Figure 5B:
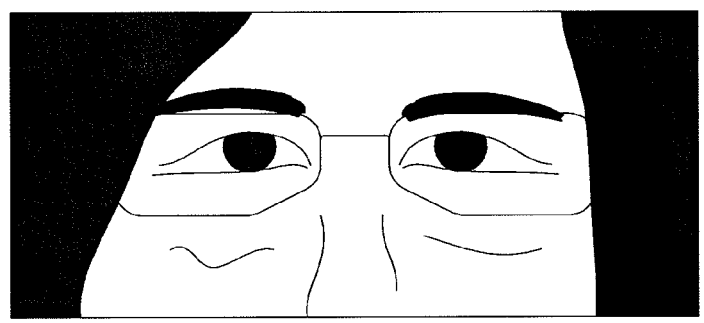
FIG. 5B is a diagram for explaining the general concept of the process of detecting an eye area according to the embodiment of the present invention.

The CPU 24 extracts an eye area estimated that it contains eyes as shown in FIG. 5B based on the parameters stored in the setting memory 28 and the detected face position and nasal aperture position. An explanation will be given more specifically using FIG. 5A. When right and left ends of the face are x=i, j, upper and bottom ends are y=m, n, and the y-coordinate of a nasal aperture is u, the eye area setting parameters a, b stored in the setting memory 28 as shown in FIG. 4 are used. Then, an eye area can be expressed as $i \leq x \leq j$ and $v \leq y \leq w$ (where v=m+b, and w=u−a).

As shown in FIGS. 6A to 6D, the CPU 24 measures a brightness distribution in the eye area. Next, the CPU 24 calculates an average brightness from the measured brightness distribution. Thereafter, as shown in FIG. 7, when the average brightness is out of a predetermined range, i.e., is smaller than or equal to the lowermost threshold stored in the setting memory 28, or is larger than or equal to the uppermost threshold stored therein, the CPU 24 increases the light amount of illumination. When the average brightness is within the predetermined range, the CPU 24 maintains this light amount.

An explanation will be given of four patterns of brightness distribution.

Figure 6A:
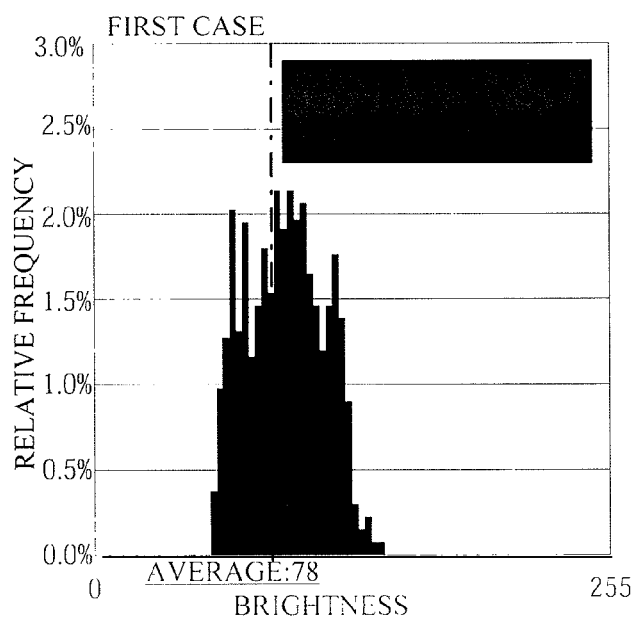
FIG. 6A is a diagram for explaining a general concept of a process of controlling an illumination light source according to the embodiment of the present invention.
Figure 7:
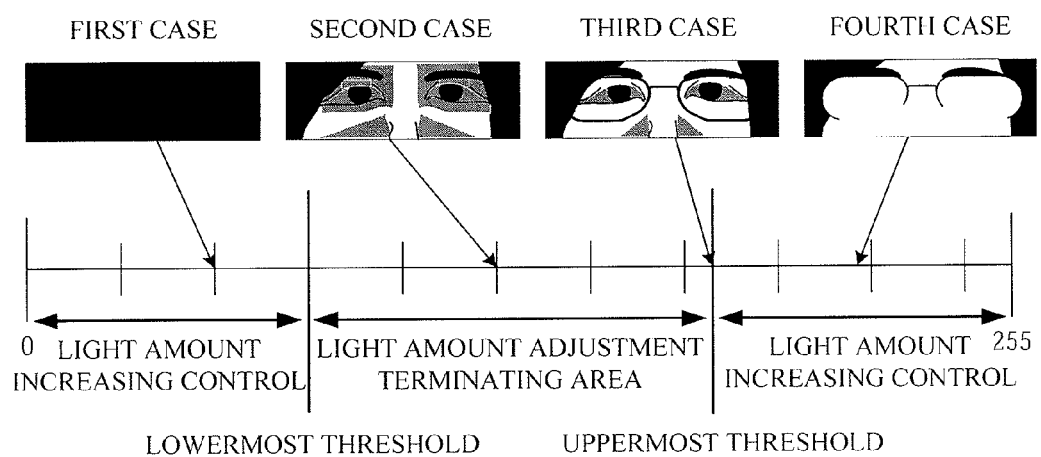
FIG. 7 is a diagram for explaining the general concept of the process of controlling an illumination light source according to the embodiment of the present invention.

A first case shown in FIG. 6A is a condition that illumination by the illumination light source 12 is too insufficient. That is, as shown in FIG. 7, it is a condition that the average brightness of the eye area is smaller than the lowermost threshold. In this case, the face image pickup device 50 controls the light-source control device 27 to increase the light amount.

Figure 6B:
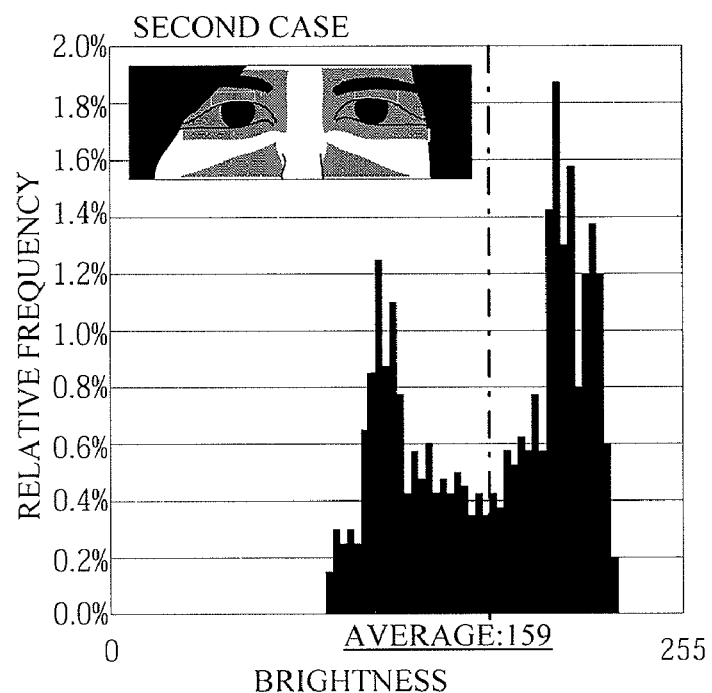
FIG. 6B is a diagram for explaining the general concept of the process of controlling an illumination light source according to the embodiment of the present invention.

A second case shown in FIG. 6B is a condition that illumination by the illumination light source 12 is appropriate. That is, as shown in FIG. 7, the average brightness of the eye area is larger than the lowermost threshold, and is smaller than the uppermost threshold. In this case, the face image pickup device 50 maintains this light amount.

Figure 6C:
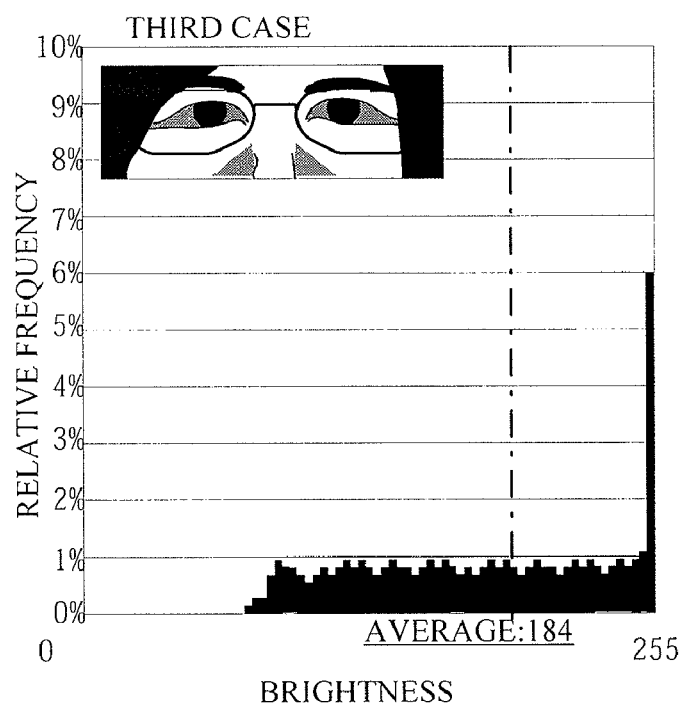
FIG. 6C is a diagram for explaining the general concept of the process of controlling an illumination light source according to the embodiment of the present invention.

A third case shown in FIG. 6C is also a condition that illumination by the light source 12 is appropriate. That is, as shown in FIG. 7, the average brightness of the eye area is larger than the lowermost threshold, and is smaller than the uppermost threshold. In this case, the face image pickup device 50 maintains this light amount.

Figure 6D:
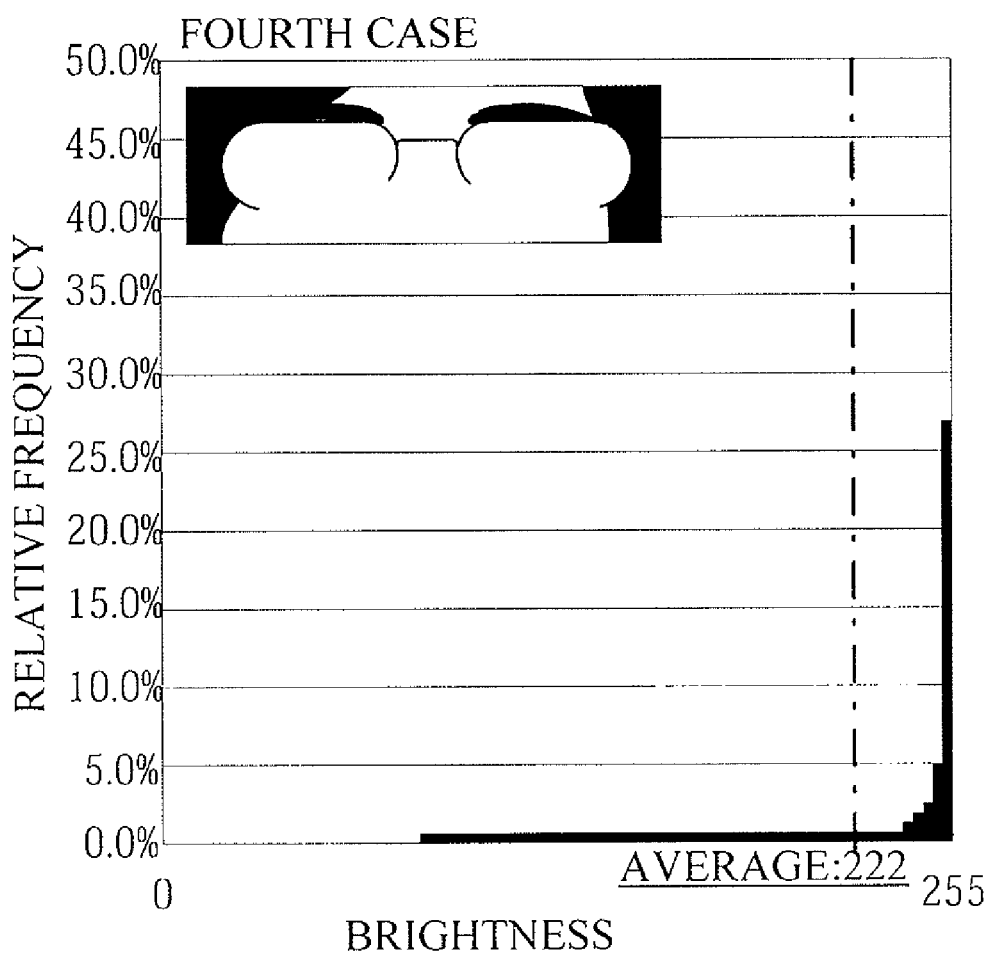
FIG. 6D is a diagram for explaining the general concept of the process of controlling an illumination light source according to the embodiment of the present invention.

A fourth case shown in FIG. 6D is a condition that an environment around the target person is projected on an eyeglass. That is, as shown in FIG. 7, the average brightness of the eye area is larger than the uppermost threshold. In this case, the face image pickup device 50 increases the light amount in such a way that an amount of light reflecting a skin and an eye through the eyeglass becomes larger than an amount of light reflecting the eyeglass. As the light amount is increased in this fashion, the light amount of the illumination light source 12 becomes appropriate as shown in FIG. 6C. Moreover, the face image pickup device 50 increases the luminance within a camera-exposing range by brightly illuminating the whole face. The face image pickup device 50 reduces a difference between the luminance of a part reflected by the eyeglass and the luminance of a whole face. As a result, an appropriate exposure to the eye area and a whole face can be acquired. Therefore, an eye-part image having no reflection and projection can be acquired.

Note that the illumination light amount initial value is set to be low so that the average brightness of the eye area does not become larger than or equal to the uppermost threshold when a target person does not wear an eyeglass.

Figure 8:
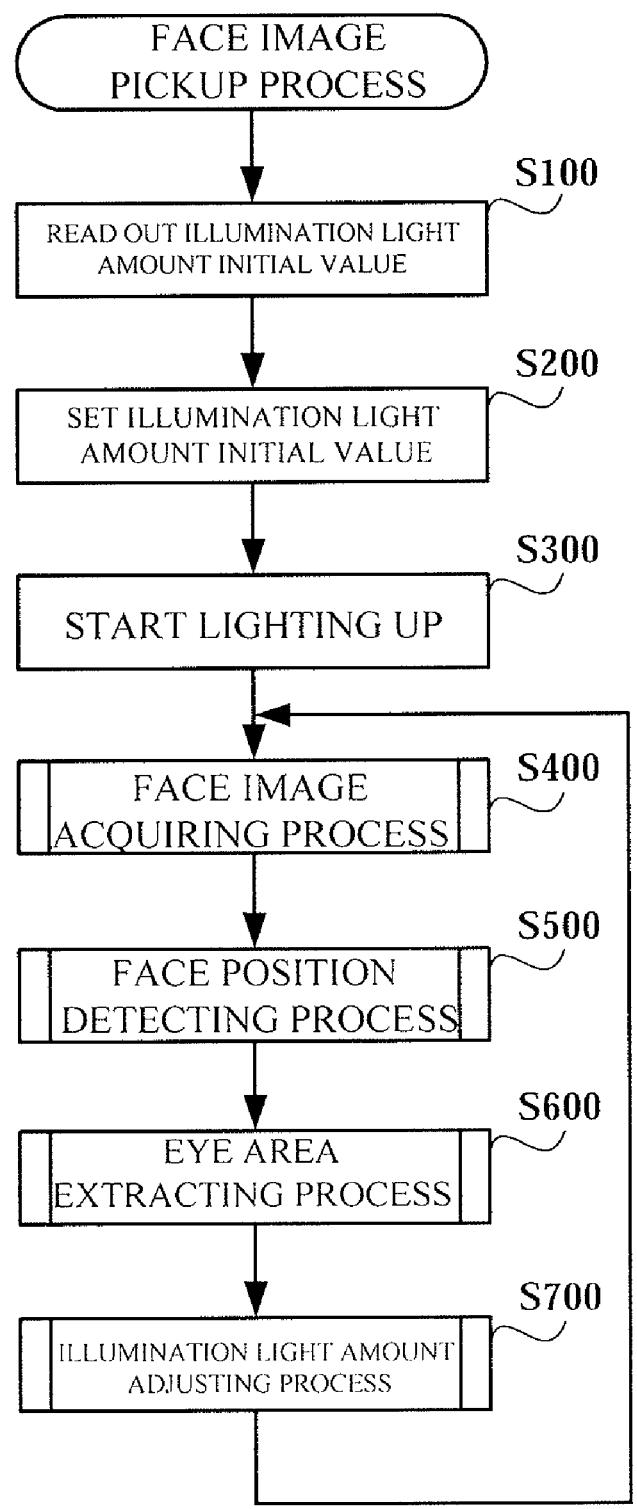
FIG. 8 is a flowchart for explaining a face image pickup process according to the embodiment of the present invention.

Next, an explanation will be given of a face image pickup process executed by the face image pickup device 50 of the embodiment of the present invention with reference to the flowchart of FIG. 8.

The CPU 24 in the computer 14 periodically (e.g., at every ⅓₀ second) repeats steps S400 to S700.

As the face image pickup device 50 is powered on, the CPU 24 reads out the illumination light amount initial value from the setting memory 28 (step S100).

Next, the CPU 24 sets the illumination light amount initial value as the illumination light amount set value (step S200).

The CPU 24 causes the illumination light source 12 to light up at the light amount of the illumination light amount set value (step S300).

The CPU 24 executes a face image acquiring process (step S400) roughly through the following procedures. First, the CPU 24 captures a face image of the driver. Next, the CPU 24 generates an image having a vertical edge emphasized. Moreover, the CPU 24 generates an image having a horizontal edge emphasized. The procedures of the face image acquiring process (step S400) will be discussed in detail later.

The CPU 24 executes a face position detecting process (step S500) roughly through the following procedures. First, the CPU 24 detects right and left ends of the face using the image having the vertical edge emphasized and generated in the face image acquiring process. Next, the CPU 24 detects upper and bottom ends of the face using the image having the horizontal edge emphasized and generated in the face image acquiring process. As a result, the CPU 24 detects the position of the face in the face image. The procedures of the face position detecting process (step S500) will be discussed in detail later.

The CPU 24 executes an eye area extracting process (step S600) of extracting an eye area from the face image using the position of the face detected in the face position detecting process. The procedures of the eye area detecting process (step S600) will be discussed in detail later.

The CPU 24 executes an illumination light amount adjusting process (step S700), and the process flow returns to the step S400. The illumination light amount adjusting process is of measuring a brightness distribution of the eye area extracted in the eye area detecting process, of calculating an average brightness from the measured brightness distribution, and of increasing the light amount of the illumination light source 12 when the calculated average brightness is out of the predetermined range, and the detail of this process will be discussed later.

As explained above, according to the face image pickup process, a face image is acquired, and an eye area is extracted from such an image. The light amount of the illumination light source 12 is adjusted based on the brightness distribution at the eye area.

Figure 9:
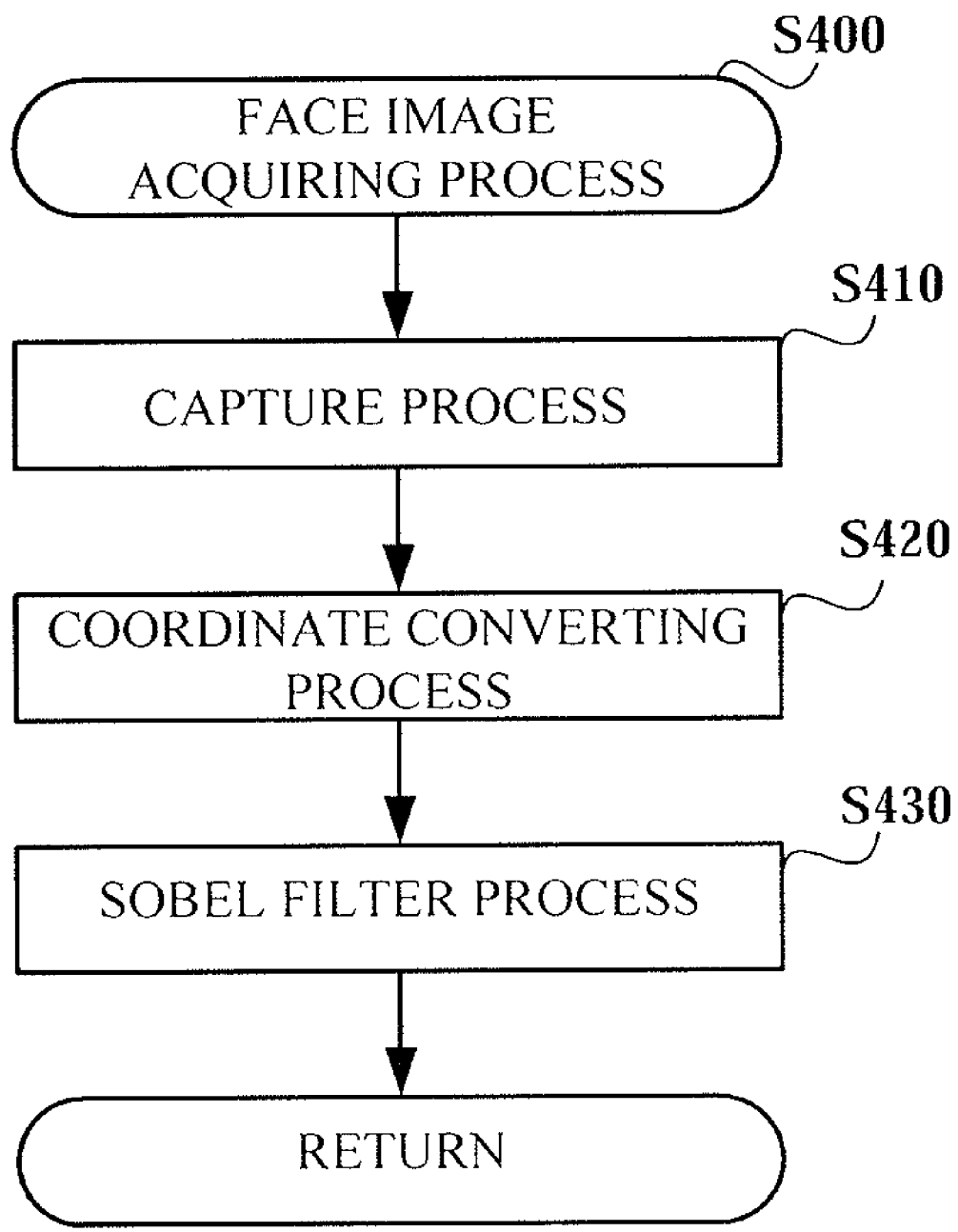
FIG. 9 is a flowchart for explaining a face image acquiring process in the face image pickup process.

As explained above, in the face image acquiring process (step S400), the face image pickup device 50 picks up a face image of the driver, and performs edge detecting using the Sobel filter, and the detail of the face image acquiring process (step S400) will be discussed now with reference to FIG. 9.

First, the CPU 24 executes a capturing process of capturing a face image of the target person picked up by the camera 10 through the A/D converter 21, and of storing such image in the image memory 22 (step S410).

Next, the CPU 24 executes a coordinate converting process. Thereafter, the CPU 24 executes a process of reducing the number of pixels in each face image stored in the image memory 22 so as to enable a processing by a Sobel filter (step S420).

The CPU 24 processes the face image having undergone the coordinate conversion using the vertical edge detecting Sobel filter (see FIG. 3A) stored in the ROM 23. Next, the CPU 24 generates an image having the emphasized vertical edge in the face image. Moreover, the CPU 24 processes the face image having undergone the coordinate conversion using the horizontal edge detecting Sobel filter (see FIG. 3B) stored in the ROM 23. Next, the CPU 24 generates an image having the emphasized horizontal edge in the face image (step S430).

In this fashion, according to the face image acquiring process, an image of emphasizing the vertical edge of the picked-up face image and an image of emphasizing the horizontal edge thereof are thus generated.

Figure 10:
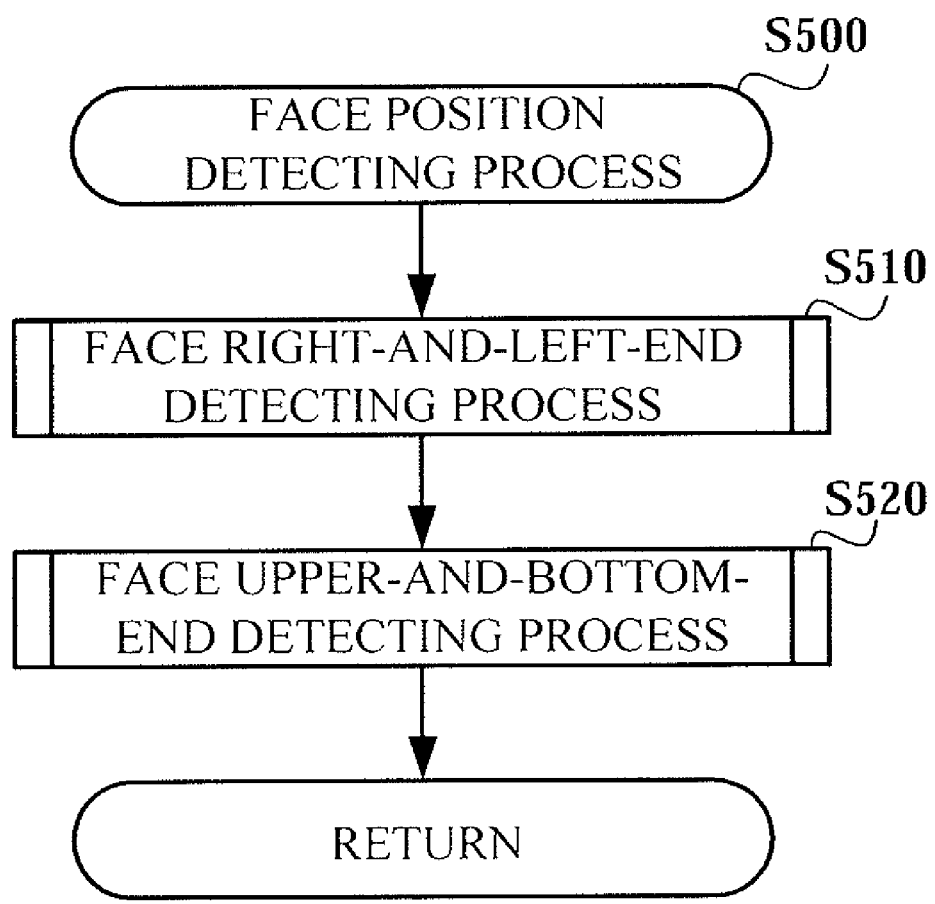
FIG. 10 is a flowchart for explaining a face position detecting process in the face image pickup process.

As explained above, in the face position detecting process (step S500), the face image pickup device 50 detects the position of the face in the face image using the image having the emphasized vertical edge and the image having the emphasized horizontal edge both generated in the face image acquiring process. The face position detecting process (step S500) will now be explained in more detail with reference to FIG. 10.

First, the CPU 24 detects positions of right and left ends of the face in the face image using the image having the emphasized vertical edge and generated through the face image acquiring process (step S400) (step S510). The procedures of detecting the positions of right and left ends of the face (face right-and-left-end detecting process) will be discussed in detail later.

Next, the CPU 24 detects positions of upper and bottom ends of the face in the face image using the image having the emphasized horizontal edge and generated through the face image acquiring process (step S400) (step S520). Thereafter, the CPU 24 completes the face position detecting process. The procedures of detecting the positions of upper and bottom ends of the face (face upper-and-bottom-end detecting process) will be discussed in detail later.

In this fashion, according to the face position detecting process (step S500), the right and left ends of the face and the upper and bottom ends thereof are detected, and thus the position of the face in the face image is detected.

Figure 11:
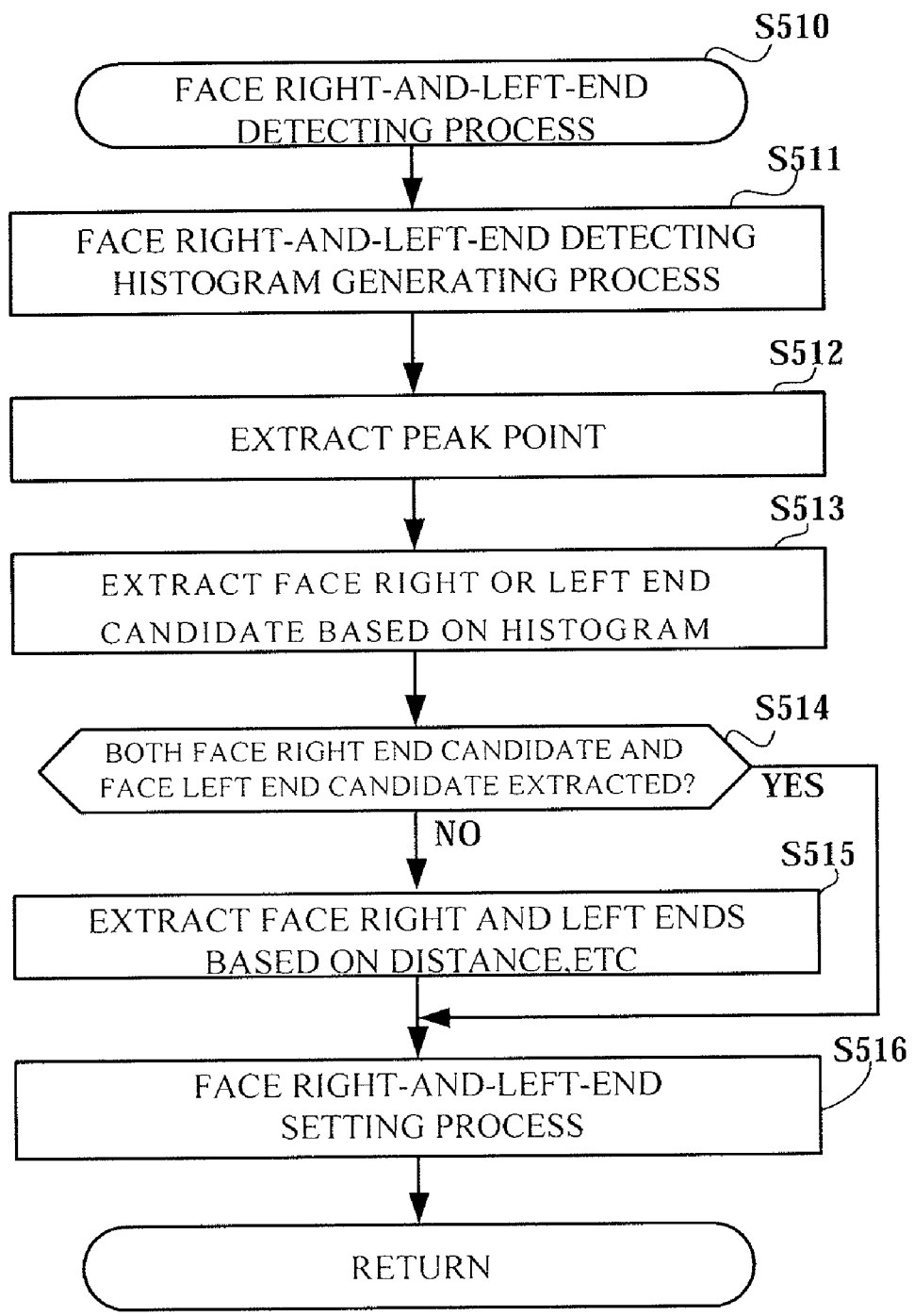
FIG. 11 is a flowchart for explaining a face right-and-left-end detecting process in the face position detecting process.

The face right-and-left-end detecting process executed in the step S510 of the face detecting process (step S500) will now be explained in more detail with reference to FIG. 11.

First, the CPU 24 executes a face right-and-left-end detecting histogram generating process (step S511). The face right-and-left-end detecting histogram generating process is a process of generating a histogram by projecting, in the vertical direction, the value of each pixel after the Sobel filter processing using the vertical edge detecting Sobel filter. More specifically, the pixel value of each coordinate is divided into several stages. Next, a stage having the largest number of pixel values of each coordinate for each x value is set. The graph of average value of the foregoing stage for each x value is then taken as a histogram.

The CPU 24 extracts a point having a peak (hereinafter, peak point) in the histogram generated in the step S511 (step S512).

The CPU 24 extracts, as a candidate of right or left end of the face, one having a histogram value larger than or equal to a threshold among the peak points extracted in the step S512 (step S513).

The CPU 24 determines whether or not two peak points having the histogram value larger than or equal to the threshold are extracted as the candidates of right and left ends of the face as a result of the process in the step S513 (step S514).

When it is determined that two peak points having the histogram value larger than or equal to the threshold are extracted (step S514: YES), the CPU 24 progresses the process to step S516. The CPU 24 sets positions of two extracted peak points as the right and left ends of the face (step S516).

When it is determined that no two peak points having the histogram value larger than or equal to the threshold are extracted (step S514: NO), the CPU 24 extracts a combination of two peak points having a spacing therebetween which is appropriate as the width of a face among peak points (step S515).

The CPU 24 sets the positions of the extracted two peak points as the right and left ends of the face (step S56ˆ16).

In this fashion, according to the face right-and-left-end detecting process (step S510), the right and left ends of the face are thus detected in the face image.

Figure 12:
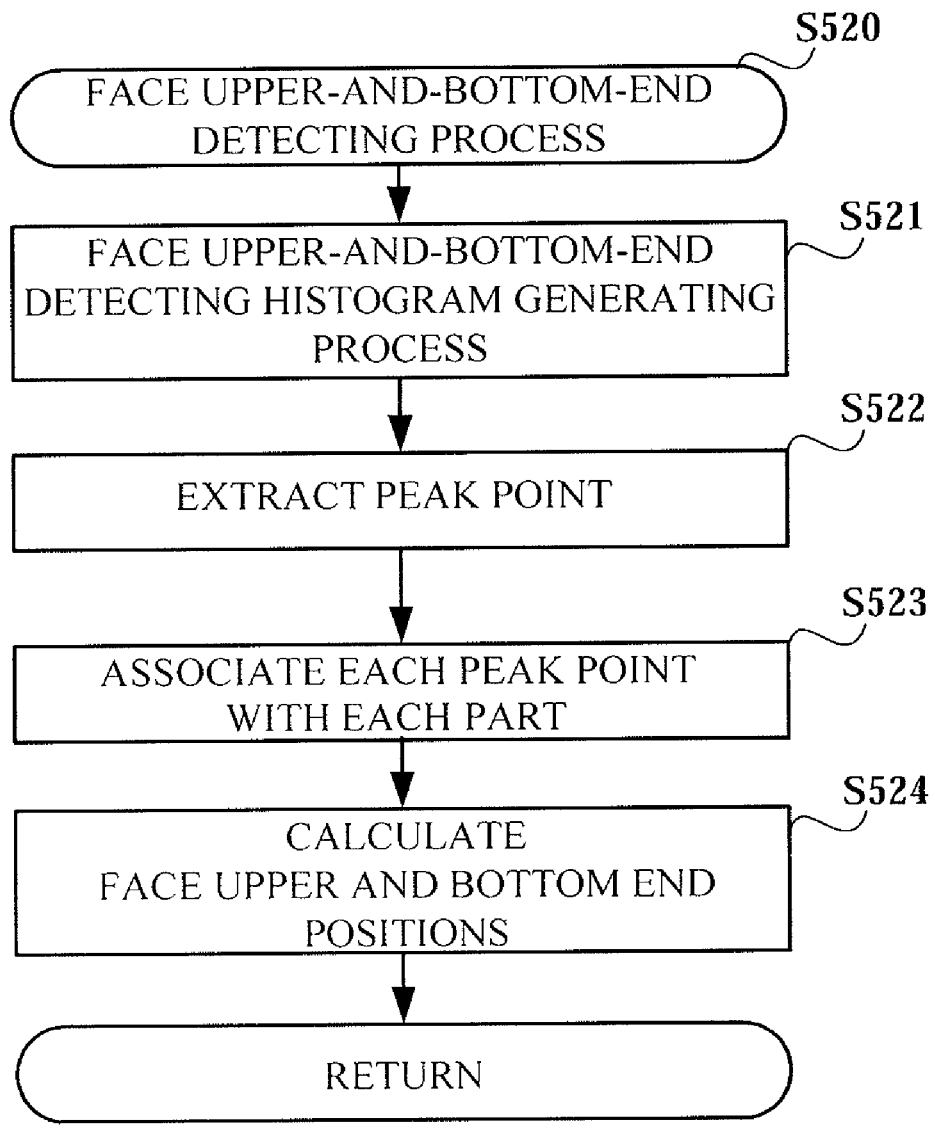
FIG. 12 is a flowchart for explaining a face upper-and-bottom-end detecting process in the face position detecting process.

The face upper-and-bottom-end detecting process executed in the step S520 of the face position detecting process (step S500) will now be explained in more detail with reference to FIG. 12.

First, the CPU 24 executes a face upper-and-bottom-end detecting histogram generating process (step S521). The face upper-and-bottom-end detecting histogram generating process is a process of generating a histogram by projecting, in the horizontal direction, the value of each pixel after the Sobel filter processing using the horizontal edge detecting Sobel filter. More specifically, the pixel value of each coordinate is divided into several stages. Next, a stage having the largest number of pixel values of each coordinate for each y value is set. A graph of the average value of the stage for each y value is taken as a histogram.

The CPU 24 extracts a point having a peak (hereinafter, peak point) in the histogram generated in the step S521 (step S522).

The CPU 24 associates each peak point with an eye, en eyebrow, a mouth, or the like based on the histogram value of the peak point extracted in the step S522 (step S523).

The CPU 24 calculates positions of upper and bottom ends of the face in the face image based on each peak point associated with an eye, an eyebrow, a mouth or the like (step S524). For example, a position above the detected eyebrow by what corresponds to three pixels is set as the upper end of the face. Moreover, a position below the detected mouth by what corresponds to three pixels is set as the bottom end of the face (between the mouth and the jaw).

In this fashion, according to the face upper-and-bottom-end detecting process (step S520), the positions of upper and bottom ends of the face are thus detected in the face image.

Figure 13:
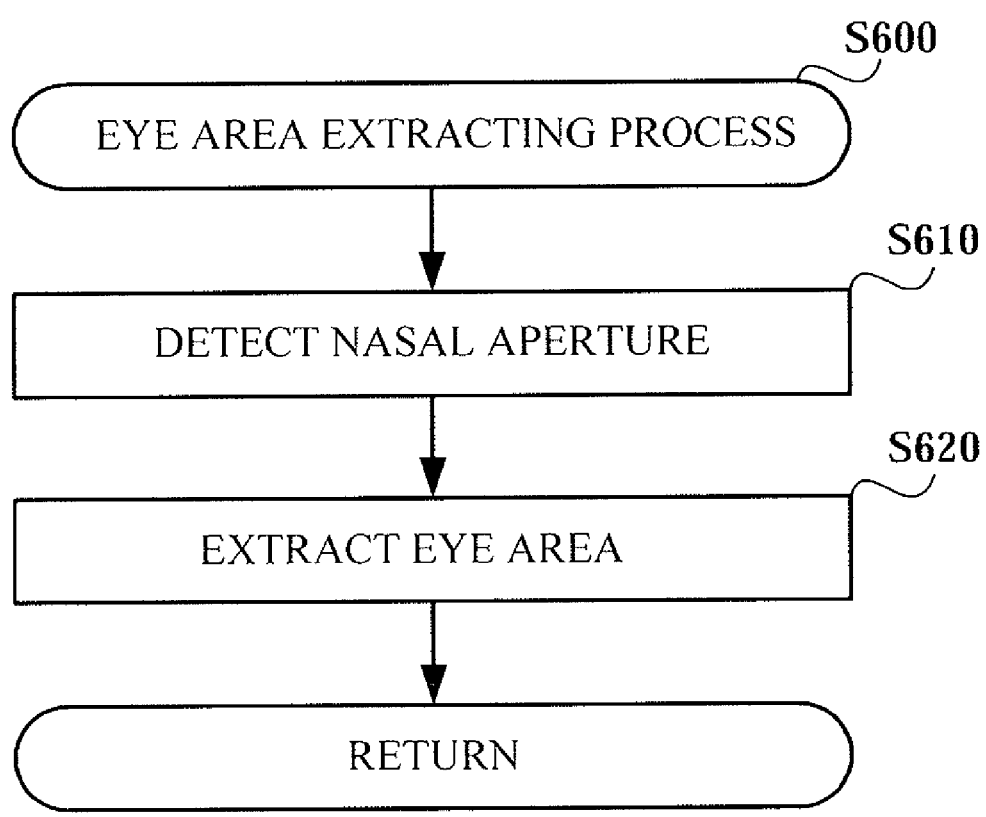
FIG. 13 is a flowchart for explaining an eye area extracting process in the face image pickup process.

As explained above, in the eye area extracting process (step S600), first, the face image pickup device 50 detects the position of a nasal aperture, and estimates an area where eyes are present based on the position of the nasal aperture, and the position of the face detected in the face position detecting process. The eye area extracting process executed in the step S600 of the face image pickup process will now be explained in more detail with reference to FIG. 13.

First, the CPU 24 detects a part where pixels having brightness smaller than or equal to the predetermined brightness are continuous in the vertical direction by what corresponds to three to five pixels from a range in the face image set based on the position of the face detected in the face position detecting process (step S500). Moreover, the CPU 24 detects a part where pixels having brightness smaller than or equal to the predetermined threshold are continuous in the horizontal direction by what corresponds to three to five pixels from a range in the face image set based on the position of the face detected in the face position detecting process. The CPU 24 detects an overlapped portion of those parts as the position of a nasal aperture (step S610).

The CPU 24 extracts an image of an eye area estimated that eyes are present from each face image stored in the image memory 22 based on the position of the face detected in the face position detecting process (step S500), the position of the nasal aperture, and the eye area setting parameters (step S620).

In this fashion, according to the eye area extracting process (step S600), an area estimated that eyes are present is thus extracted.

Figure 14:
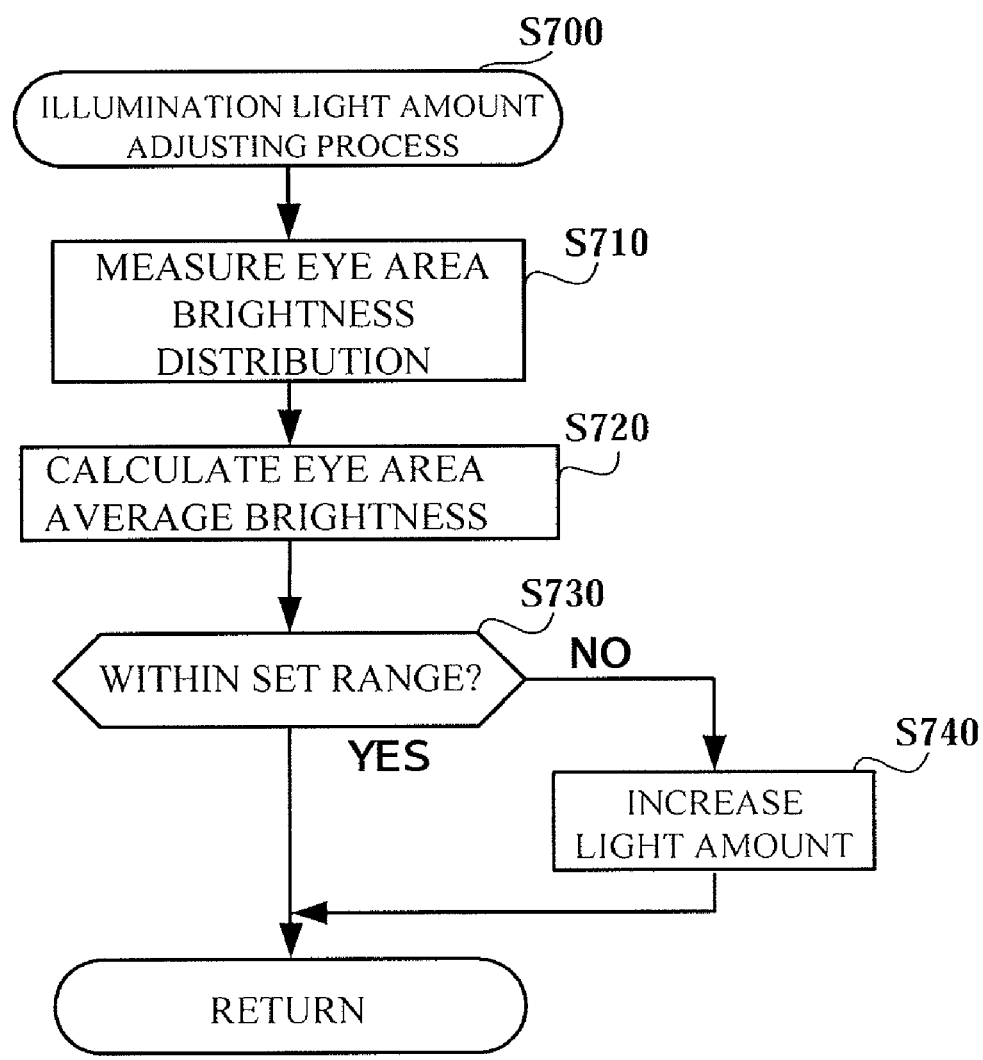
FIG. 14 is a flowchart for explaining an illumination light amount adjusting process in the face image pickup process.

As explained above, in the illumination light amount adjusting process executed in the step S700 of the face image pickup process, the face image pickup device 50 measures a brightness distribution in the eye area extracted in the eye area extracting process (step S600), and calculates the average brightness of the eye area. When the average brightness is out of the predetermined range, the illumination light amount is increased. The illumination light amount adjusting process will now be explained in more detail with reference to FIG. 14.

First, the CPU 24 measures a brightness distribution in the eye area extracted through the eye area extracting process (step S600) (step S710).

The CPU 24 calculates the average brightness of the eye area based on the brightness distribution measured in the step S710 (step S720).

The CPU 24 determines whether or not the average brightness calculated in the step S720 is larger than or equal to the lowermost threshold and is smaller than or equal to the uppermost threshold both stored in the setting memory 28. That is, it is determined whether or not the average brightness is within the set range (step S730).

When it is determined that the average brightness is within the set range (step S730: YES), the CPU 24 completes the illumination light amount adjusting process. The process flow goes back to the face image pickup process.

When it is determined that the average brightness is out of the set range (step S730: NO), the CPU 24 controls the light source control device 27 to increase the light amount of the illumination light source 12 (step S740). The CPU 24 then completes the illumination light amount adjusting process (step S700). Thereafter, the process flow goes back to the face image pickup process.

In this fashion, according to the illumination light amount adjusting process (step S700), the illumination light amount is thus optimized based on the brightness distribution of the eye area.

As explained above, the face image pickup device 50 detects the position of a face from a picked-up face image, and estimates an area where eyes are present based on the detected face position. The face image pickup device 50 measures the brightness distribution of that area, and calculates the average brightness of the eye area based on the brightness distribution. The face image pickup device 50 determines whether or not to increase the light amount of the illumination light source 12 based on the average brightness. The face image pickup device 50 optimizes the illumination light amount in this fashion, thereby acquiring an image with a good quality.

The present invention is not limited to the foregoing embodiment, and can be change and modified in various forms.

For example, in the foregoing embodiment, extraction is performed through edge detection using a Sobel filter when the face image pickup device 50 detects the position of a face. However, such extraction can be performed through concentration detection utilizing a concentration gradient instead of such edge detection.

In the foregoing embodiment, a Sobel filter processing is performed on a face image in the face position detecting process (step S500). The position of the face is detected from a histogram based on the pixel values having undergone the Sobel filter processing. Instead of such processes, means disclosed in Unexamined Japanese Patent Application KOKAI Publication No. 2004-310396 may be utilized. That is, a time differentiation is performed for each pixel configuring a picked-up image, the image having undergone the time differentiation is projected in the vertical direction to generate a histogram, a histogram of an edge-extracted image and a histogram of a time-differentiation image are summed up, and parts having a high peak value in the summed histogram may be taken as respective both ends of a face.

A template matching technique may be applied to the face position detecting process (S500). That is, the template of a face registered beforehand may be matched with a face image to detect the position of a face.

Moreover, a template matching technique may also be applied to the eye area extracting process (step S600) and the eye determining process. That is, the template of eyes is matched with a face image to detect the position of eyes. The area of detected eyes is calculated and opening/closing of the eyes can be determined based on the calculated area.

In the foregoing embodiment, the bandpass filter is used to filtrate light to be received by the camera 10, but a high-pass filter may be used depending on the sensitivity of the camera 10.

In the foregoing embodiment, the face image pickup device 50 determines whether or not to increase the light amount based on the average brightness of an eye area, but instead of this, the face image pickup device 50 may determine whether or not to increase the light amount based on the repetition of predetermined brightness of the eye area. Moreover, the face image pickup device 50 may determine whether or not to increase the light amount based on the brightness dispersion of the eye area.

When the brightness distribution does not change even if the light amount is increased, or when it is still difficult to detect eyes, the face image pickup device 50 may determine that the imaging target person wears an eye bandage or sunglasses having a low light transmittance. Thereafter, the face image pickup device 50 may terminate changing of the light amount.

Detection of an eye area, measurement of a brightness distribution, calculation of an average brightness, and changing of a light amount may be performed individually for each right or left eye.

The face image pickup device of the present invention may further have a function of determining a condition of a driver, such as an inattentive driving or a drowsy driving, from a picked-up face image. Moreover, the face image pickup device may further have a function of alerting the driver as needed. In this case, the CPU analyzes the image of a face area picked up by the camera. The CPU determines whether or not the drive is doing a dangerous driving, such as an inattentive driving or a drowsy driving. When the driver is doing a dangerous driving, the face image pickup device causes an alert device to alert the driver.

For example, the CPU analyzes an image of a face area, and detects the eyes of the driver. The CPU detects the direction of a visual line from the image of the eyes. When a difference between the direction of a visual line and the front direction of a vehicle is larger than or equal to a predetermined value and such a condition continues for a predetermined period, the CPU can determine that the driver is doing an inattentive driving.

Moreover, for example, the CPU detects opening/closing of the eyes from an image of the eyes of the driver, and when a condition that the eyes are closed for greater than or equal to a predetermined period is detected, the CPU can determine that the driver is doing a drowsy driving.

Note that the face image pickup device of the present invention can be realized using an ordinary computer system, not an exclusive system. For example, a program for executing the foregoing operations is stored in a computer-system-readable recording medium (a flexible disk, a CD-ROM, a DVD-ROM or the like) and distributed to a computer having an image pickup device and an illumination device. The program is installed in the computer system. The face image pickup device executing the foregoing processes can be configured in this fashion. Moreover, the program may be stored in a storage device possessed by a server device over a communication network like the Internet. The face image pickup device may be configured as an ordinary computer system downloads the program.

When the foregoing functions are realized by task assigning by an OS (Operating System) and an application or by collaborative operation by the OS and the application, only the application part may be stored in a recording medium or a storage device.

The program may be superimposed on a carrier wave and distributed over a communication network. For example, the program may be stored in a server over the communication network. The program may be distributed through the network. The program is activated and executed like other application programs under the control of the OS. A configuration of executing the foregoing processes can be realized in this fashion.

This application is based on Japanese Patent Application No. 2007-291965 filed on Nov. 9, 2007. The specification, claims, and drawings of this Japanese Patent Application are herein incorporated entirely by reference.

INDUSTRIAL APPLICABILITY

The present invention is useful for a face image pickup device, more particularly, a face image pickup device which is loaded in a vehicle, monitors the driver of the vehicle, and contributes to improvement of the safety of the vehicle. Moreover, the present invention is useful for a face image pickup method executed by the face image pickup device or a program executed by a computer and allowing the computer to function as the face image pickup device.

The invention claimed is:

1. A face image pickup device comprising:
face image pickup unit which picks up an image of a face of a target person;
illumination unit which illuminates the face of the target person with near-infrared light having an arbitrary light amount;
eye area detecting means which detects an area including an eye from the face image of the target person picked up by the face image pickup unit;
brightness-distribution measuring unit which measures a brightness distribution in the area detected by the eye area detecting unit in the face image of the target person picked up by the face image pickup means; and
control unit which controls the illumination unit so as to increase an amount of the near-infrared light when an average brightness is greater that a predetermined range by calculating the average brightness in the area based on the brightness distribution measured by the brightness-distribution measuring unit.

2. The face image pickup device according to claim 1, wherein the face image pickup unit includes an optical filter which is arranged on an optical axis for picking up an image of the face of the target person and which allows arbitrary long wavelength including near-infrared light to transmit.

3. The face image pickup device according to claim 2, wherein
the illumination unit includes an LED (Light Emitting Diode) emitting near-infrared light transmissive through the optical filter, and
the LED illuminates the face of the target person with the near-infrared light.

4. The face image pickup device according to claim 3, wherein the amount of the near-infrared light emitted by the illumination unit is adjusted by a current value input into the LED or a duty ratio by a pulse light emitting.

5. The face image pickup device according to claim 1, wherein the face image pickup unit is arranged on a top face of a steering column of a vehicle.

6. The face image pickup device according to claim 1, wherein the face image pickup unit is arranged on a top face of an instrumental panel of a vehicle.

7. The face image pickup device according to claim 1, wherein the face image pickup unit is arranged on a top face of a center console of a vehicle.

8. The face image pickup device according to claim 1, wherein the face image pickup unit is arranged in a rearview mirror of a vehicle.

9. A face image pickup method executed by a device comprising a face image pickup unit which picks up an image of a face of a target person and an illumination means which illuminates the face of the target person with a near-infrared light having an arbitrary light amount, the method comprising:
an eye area detecting step of detecting an area including an eye from the face image of the target person picked up by the face image pickup means;
a brightness-distribution measuring step of measuring a brightness distribution in the area detected in the eye area detecting step in the face image of the target person picked up by the face image pickup means; and
a control step of controlling the illumination means so as to increase an amount of the near-infrared light when an average brightness is greater than a predetermined range by calculating the average brightness in the area based on the brightness distribution measured in the brightness-distribution measuring step.

10. A non-transitory computer-readable medium storing a program allowing a computer which includes a face image pickup unit that picks up an image of a face of a target person and an illumination unit that illuminates the face of the target person with a near-infrared light having an arbitrary light amount to function as:
an eye area detecting unit which detects an area including an eye from the face image of the target person picked up by the face image pickup unit;
a brightness-distribution measuring unit which measures a brightness distribution in the area detected by the eye area detecting unit in the face image of the target person picked up by the face image pickup unit; and
a control unit which controls the illumination unit so as to increase an amount of the near-infrared light when an average brightness is greater than a predetermined range by calculating the average brightness in the area based on the brightness distribution measured by the brightness-distribution measuring unit.

* * * * *